(12) United States Patent
Anast (10) Patent No.: US 6,648,273 B2
(45) Date of Patent: Nov. 18, 2003

(54) LIGHT WEIGHT AND HIGH STRENGTH FUSELAGE

(75) Inventor: Peter Z. Anast, Sammamish, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/017,732

(22) Filed: Oct. 30, 2001

(65) Prior Publication Data

US 2003/0080251 A1 May 1, 2003

(51) Int. Cl.$^7$ .................................................. B64C 1/12
(52) U.S. Cl. ....................................... 244/119; 244/120
(58) Field of Search ........................... 244/117 R, 119, 244/120, 121, 123, 133, 132

(56) References Cited

U.S. PATENT DOCUMENTS

| | | |
|---|---|---|
| 1,774,593 A | 9/1930 | Day et al. |
| 3,600,016 A | 8/1971 | Dilley |
| 3,976,269 A * | 8/1976 | Gupta ......................... 244/119 |
| 4,344,995 A * | 8/1982 | Hammer ....................... 428/61 |
| 4,489,123 A | 12/1984 | Schijve et al. |
| 4,500,589 A | 2/1985 | Schijve et al. |
| 4,992,323 A | 2/1991 | Vogelesang et al. |
| 5,039,571 A | 8/1991 | Vogelesang et al. |
| 5,242,523 A * | 9/1993 | Willden et al. ............. 156/285 |
| 5,429,326 A | 7/1995 | Garesché et al. |
| 5,866,272 A * | 2/1999 | Westre et al. ................ 428/593 |
| 5,951,800 A | 9/1999 | Pettit |
| 6,328,260 B1 * | 12/2001 | Tarbox et al. ............... 244/131 |
| 6,394,394 B1 * | 5/2002 | Raun et al. ............. 244/158 R |

OTHER PUBLICATIONS

"Real Aircraft Structures", http://www.ae.msstate.edu/~masoud/Teaching/SA2/slides.html, Boeing 727 structure of fuselage.*

* cited by examiner

*Primary Examiner*—Peter M. Poon
*Assistant Examiner*—T D. Collins
(74) *Attorney, Agent, or Firm*—Alston & Bird LLP (57) ABSTRACT

A fuselage comprising a skin assembly including an outer, laminate skin bonded to an inner, aluminum doubler. The fuselage also includes a support structure comprising a plurality of longitudinal stringer members and a plurality of annular frame members that are attached to, and cooperate to support, the skin assembly. The aluminum doubler provides additional structural support for the fuselage, and in particular, for the outer laminate skin of the skin assembly. The additional structural strength added by the aluminum doubler allows the use of an improved range of fasteners, such as knife-edge, countersink rivets and further allows the use of the laminate layer even in areas with a large number of cutouts, such as the window track of the fuselage. The members of the support structure may interconnected via a plurality of integral flanges, which, when combined with the skin, provide improved structural strength for the entire fuselage.

17 Claims, 6 Drawing Sheets

LIGHT WEIGHT AND HIGH STRENGTH FUSELAGE

FIELD OF THE INVENTION

The present invention relates to the construction of aerospace vehicle fuselages, and more particularly, to fuselage assemblies that include laminate skins having alternating metal and non-metal panels.

BACKGROUND OF THE INVENTION

The use of laminate panels in aerospace construction is advantageous as the laminate panels typically have a high strength and a relatively low weight. One problem encountered with laminate panels, however, is the limited commercial availability of large laminate panels. U.S. Pat. No. 5,429,326 by Garesche et al. discloses a system for splicing laminate subpanels to make larger laminate panels for use in an aircraft fuselage. As shown in FIGS. 3A and 3B of Garesche et al., a spliced laminate panel 20 includes alternating metal layers 50 and adhesive layers 51. The metal layers are made of sections separated by spaced splice lines 55, 56, 57 and 58. Ostensibly, the spacing between the splice lines improves the strength of the final assembled panel. The aircraft fuselage includes a support structure comprised of longitudinally extending stringers 24 supported by circumferentially extending frame members 22. The laminate panels are attached to the stringers and frame members so as to form a skin, as shown in FIG. 1 of Garesche et al. The laminate panels are attached to the stringers using rivets 71, 72 that transfixes both the stringer and the panel, as shown in FIG. 7 of Garesche et al.

Although the splicing system disclosed by Garesche et al. has excellent strength characteristics, improvements in the structural strength for aircraft fuselages are always highly desired. U.S. Pat. No. 5,951,800 to Pettit discloses a splice that includes a plurality of splice straps 20 layered over the staggered splice lines so as to provide local reinforcement for the splice joint. As shown in FIGS. 1–3 of Garesche et al., the splice straps are solid sheets of metal that overlie the outermost abutting metal sheets of the laminate structure. The splice straps have sufficient width to exceed the staggered offset between all of the breaks within the splice structure. Thus, the splice straps provide further improvement in the structural strength of the splices used to construct the large laminate sheet for an aircraft fuselage.

Although some types of fasteners can be used with the large laminate panels, as described by Garesch et al., aircraft manufacturers have relied mostly on bonding for attachment of the laminate skin to the underlying frame and stringer assembly of the fuselage. Reliance on bonding over the use of fasteners is most likely due to concerns about compromising the structural strength of the spliced laminate with the insertion of fasteners. Bonding processes are generally problematic due to the need to anodize the metal being bonded and due to uneven process control during application of the adhesive. In addition, there has been a tendency to avoid placing cutouts through the laminate skins, such as for the insertion of windows, that has led to a preference for limited use of the laminate skins on the fuselage. However, limited use of laminate skins results in "mixed joints, which are joints between the laminate skin and the solid metal skin. It is typically difficult to construct such mixed joints due to the different materials of the laminate and solid metal skins.

Therefore, it would be advantageous to have a system and method that allows greater employment of laminate materials in an aircraft fuselage so as to improve the strength and reduce the weight of the fuselage. In particular, it would be advantageous to have an aircraft fuselage that includes laminate panels used in areas with a large number of cutouts. Further, it would be advantageous if the laminate panels could be connected to the underlying stringers and frame members in such a way as to improve the structural integrity of the finished fuselage.

SUMMARY OF THE INVENTION

The present invention addresses the above needs and achieves other advantages by providing a fuselage comprising a skin assembly including an outer, laminate skin bonded to an inner, aluminum doubler. The fuselage also includes a support structure comprising a plurality of longitudinal stringer members and a plurality of annular frame members that are attached to, and cooperate to support, the skin assembly. Advantageously, the aluminum doubler provides additional structural support for the fuselage, and in particular, for the outer laminate skin of the skin assembly. The additional structural strength added by the aluminum doubler allows the use of an improved range of fasteners, such as knife-edge, countersink rivets and further allows the use of the laminate layer even in areas with a large number of cutouts, such as the window track of the fuselage. In addition, the members of the support structure may be interconnected via a plurality of integral flanges, which, when combined with the skin, provide improved structural strength for the entire fuselage.

In one embodiment, the present invention includes an assembly combining a collection of individual parts into a low weight but high strength fuselage for an aircraft. The fuselage assembly includes a plurality of longitudinal stringer members, a plurality of annular frame members, a lightweight doubler and a laminate sheet. The longitudinal stringer members are radially spaced from, and extend generally parallel to, the major longitudinal axis of the fuselage. Further, the longitudinal stringer members are spaced circumferentially from each other. Each of the longitudinal stringer members has a stringer wall structure that includes an outer longitudinal surface. The annular frame members are spaced along the longitudinal axis. Each of the frame members includes a frame wall structure having a plurality of outer circumferential surfaces. Each of the outer circumferential surfaces is structurally spliced by the longitudinal stringer members. The lightweight doubler is attached to, and covers, at least a portion of the outer surfaces of the frame and stringer members. The laminate sheet, comprising alternating layers of metal and composite, is disposed over and attached to the lightweight doubler so as to form an outer skin of the fuselage strengthened by the underlying doubler, the frame members and the stringer members.

The stringer wall structure of each of the longitudinal stringers may include a flange defining the outer longitudinal surface. Also, the frame wall structure of each of the frame members may include a plurality of flanges, each of the flanges defining a respective one of the outer circumferential surfaces. Each of the flanges of the wall structure overlaps a portion of the flange of each of the respective pair of longitudinal stringer members. Preferably, the overlapping flange portions, the lightweight doubler and the laminate sheet are attached together using a fastener. More preferably, the fastener is a knife-edge, countersunk fastener, such as a rivet.

Optionally, the laminate sheet may be bonded to the lightweight doubler using an adhesive layer, such as a corrosion inhibiting adhesive layer. Preferably, the surfaces of the doubler and the laminate skin are anodized before application of the adhesive layer.

Preferably, the metal layers of the laminate skin are aluminum layers and the composite layers are a mixture of fiberglass and epoxy. In addition, the doubler is preferably constructed of a lightweight aluminum.

The present invention has several advantages. The relatively thick and hard aluminum doubler reduces the stresses around the fasteners in the skin assembly. Such a reduction in the fixation stresses allows the use of a wider range of fastener types, such as the knife-edged, countersunk rivets illustrated herein that have excellent durability. Further, the doubler is easily tailored to local loading conditions (unlike most laminate skins) and is an independent, fail-safe member working with the frame and/or stringer. The doubler also allows the laminate skin to have a constant gauge, or thickness, even in areas having cutouts for receiving windows or areas requiring the use of fasteners. A constant gauge skin is more cost-effective than a customized laminate skin requiring increased thickness in areas around fasteners or cutouts. The combined use of the bond layer and the fasteners results in an improvement in fuselage strength and reliability over the use of bonding alone to attach structural members directly to a laminate skin. In addition, the configuration of the stringer members and the frame members provides for continuous load paths along the length of the stringer members and the circumference of the frame members. The result is an overall increase in the strength of the fuselage without a significant increase in weight. Such an increase in the strength of the fuselage provides the option of using smaller stringer and frame members to reduce the weight of the fuselage.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
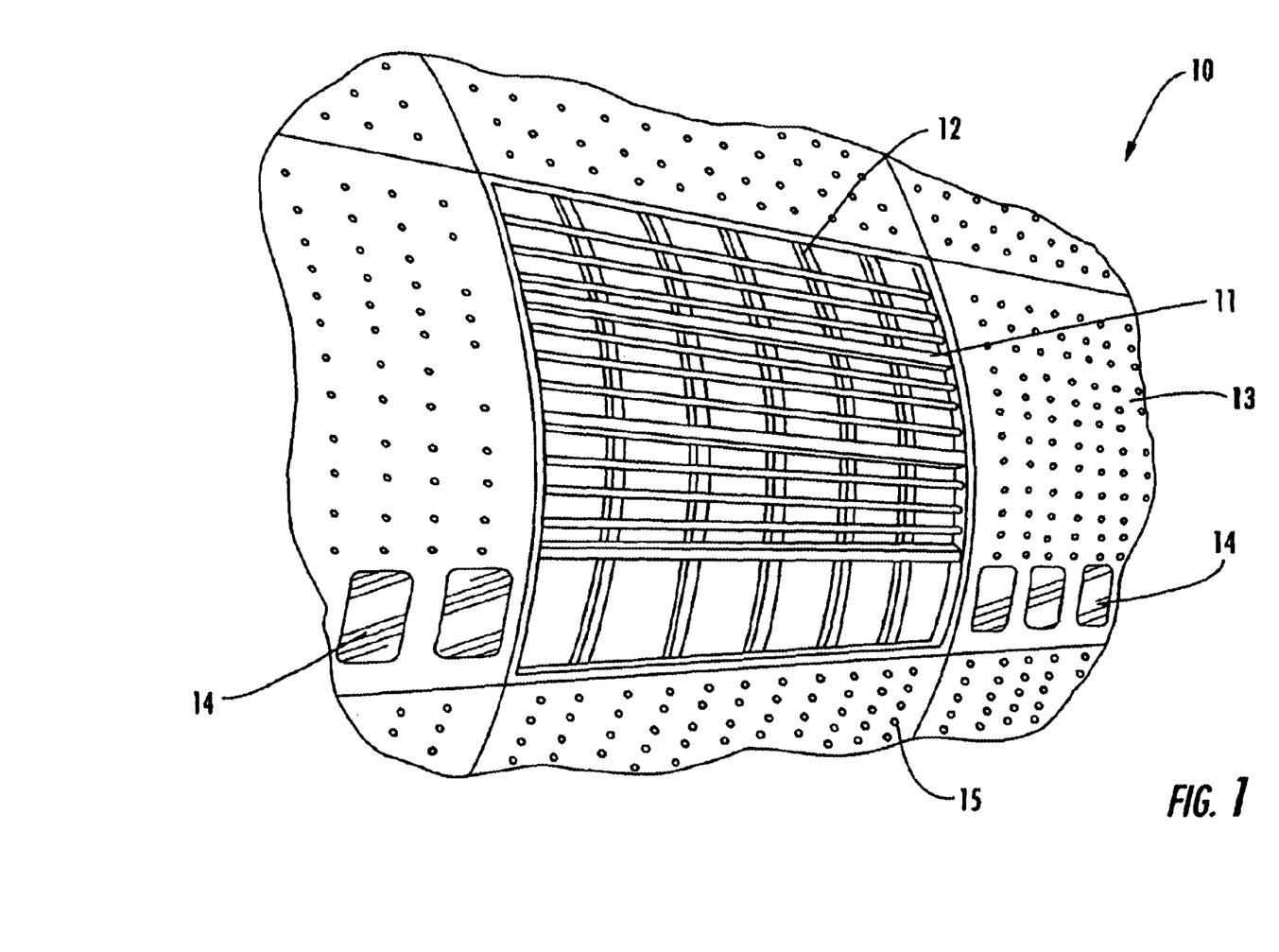
FIG. 1 is a perspective view of a portion of an aircraft fuselage of one embodiment of the present invention.
Figure 3:
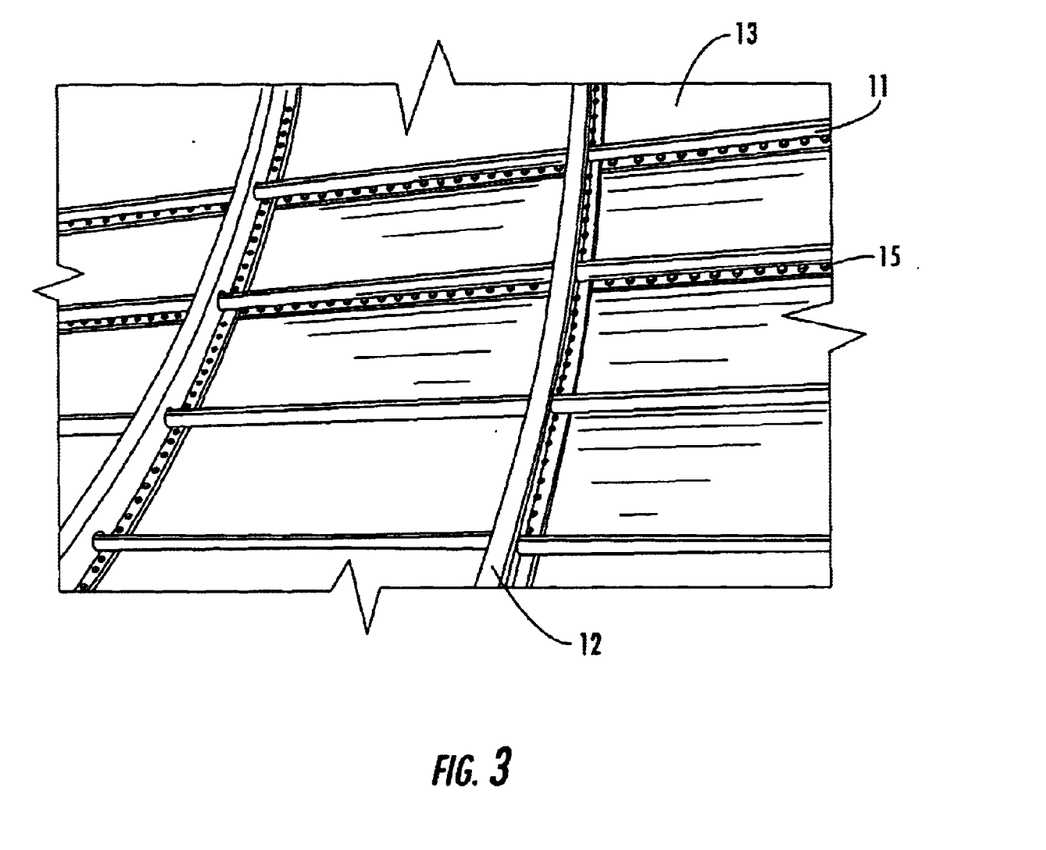
FIG. 3 is a perspective view of the inside of the fuselage of FIG. 1 showing a plurality of longitudinal stringer members and annular frame members.

An aircraft fuselage 10 of the present invention is shown in FIG. 1. The aircraft fuselage includes a plurality of stringer members 11, a plurality of frame members 12 and a skin assembly 13 having a row of windows 14 housed therein. The skin assembly 13 is attached to the members 11, 12 via an array of fasteners 15 that transfix the skin assembly and the members, as shown in FIG. 3. The fuselage 10 of the illustrated embodiment has a tapered, cylindrical shape frequently used in aircraft, but other shapes are also possible and are still considered to be within the scope of the present invention. It should also be noted that the present invention is applicable to fuselage structures for other craft, including other aerospace craft such as a rocket or a launch vehicle, where it is desirable to have a lightweight, strong structure.

Figure 2A:
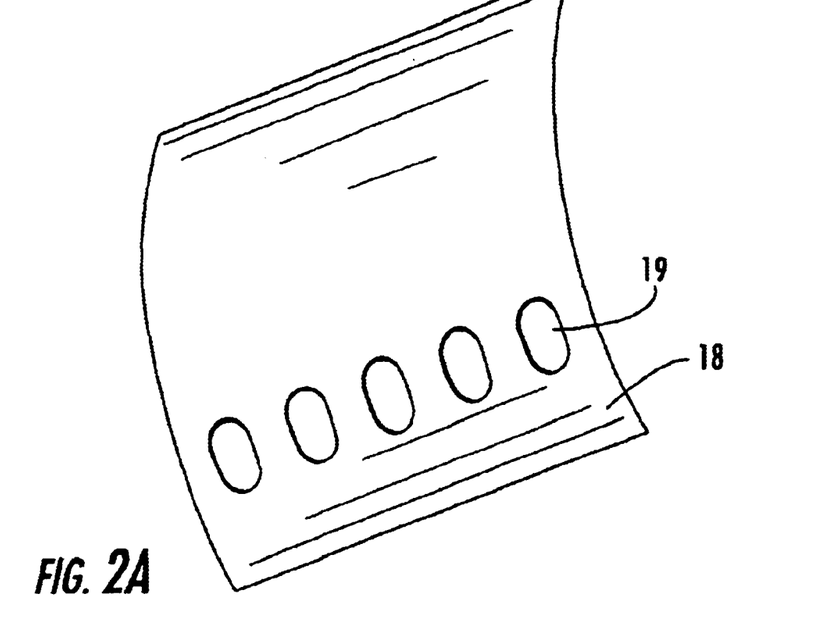
FIG. 2A is a perspective view of a laminate skin panel of the aircraft fuselage shown in FIG. 1.
Figure 2B:
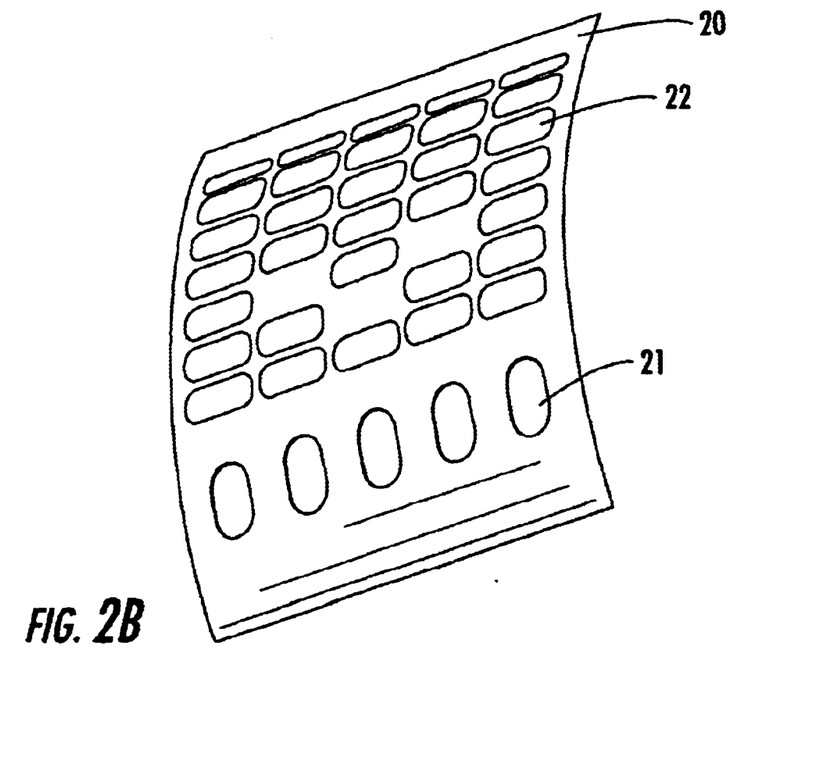
FIG. 2B is a perspective view of a lightweight aluminum doubler of the aircraft fuselage in FIG. 1.

The skin assembly 13 includes individual panels of an outer laminate skin 18 overlaid on matching panels of an inner lightweight aluminum doubler 20 for additional strength, as shown in FIGS. 2A and 2B. Both the laminate skin 18 and the doubler 20 define window openings 19 and 21, respectively, which are coincident when the laminate skin and doubler are properly assembled. Such an alignment of the window openings allows them to receive and firmly hold the windows 14, as shown in FIG. 1. The doubler 20 further defines a plurality of weight reducing cutouts 22 that are positioned to be interspersed between the members 11, 12 after the skin is assembled into the fuselage 10, as shown in FIG. 5.

Figure 4:
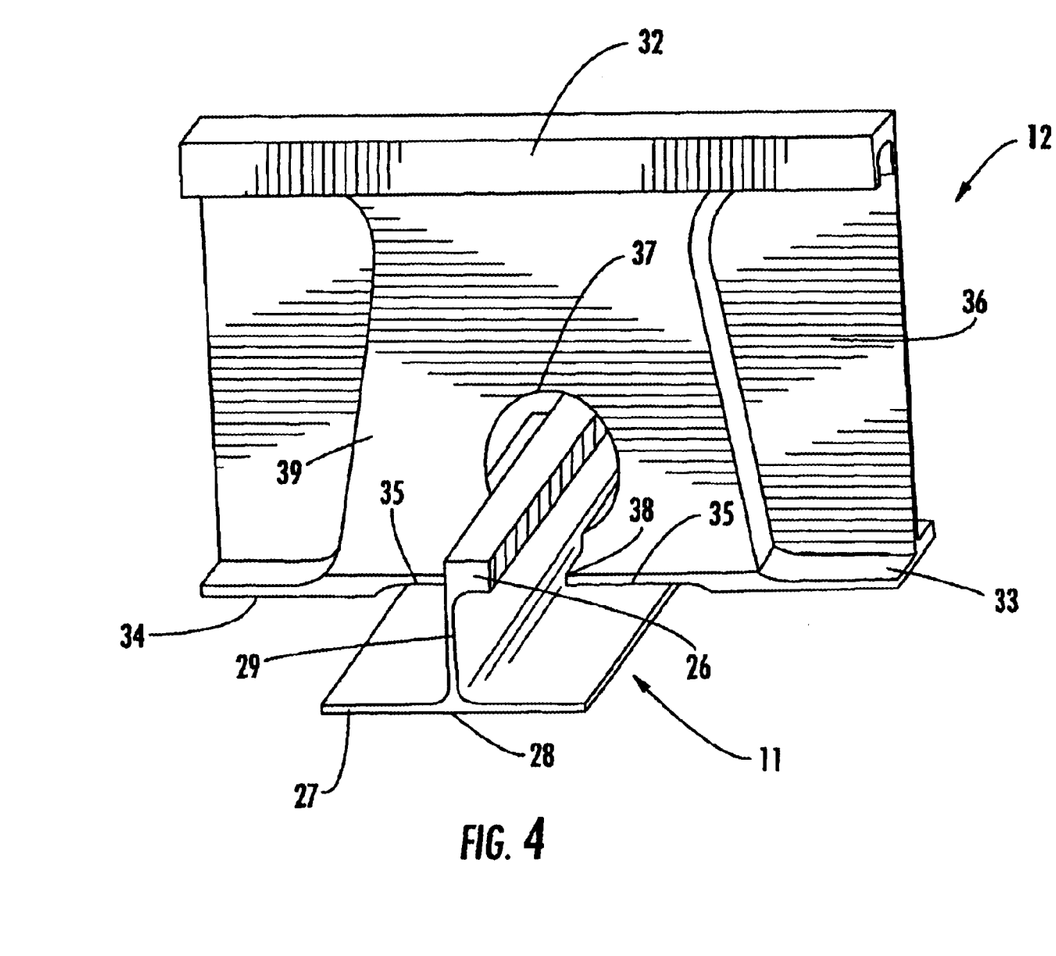
FIG. 4 is a perspective view of overlapping portions of one of the stringer members and frame members of FIG. 3.

The stringer members 11 are elongate members extending generally parallel to the axis of the aircraft fuselage 10, as shown in FIGS. 1 and 3. The frame members 12 are annular hoops, extending circumferentially around, and spaced along, said axis of the fuselage. The stringer members 11 each include a wall structure having a top flange 26 and a bottom flange 27 connected by a web 29, as shown in FIG. 4. The bottom flange 27 defines an outer longitudinal surface 28 that abuts the skin assembly 13 of the fuselage 10. In addition, the bottom flange 27 extends laterally outwards from both sides of the web 29 locally at the frame to splice the frame bottom flange 33. Bottom flange 27 is tailored between frames to react to flight and pressure loads. The top flange 26 of the stringer member extends laterally outwards from one side of the web 29 and is relatively narrow compared to the height of the stringer member.

The frame members 12 also each include a wall structure having a top flange 32 and a bottom flange 33 connected by a web 36. The bottom flange 33 extends laterally outwards from both sides of the web 36, while the top flange 32 extends laterally outwards from one side of the web 36. The web of each of the frame members 12 defines a plurality of openings 37, each of the openings corresponding to one of the stringer members 11. The bottom flange 33 also defines a plurality of flange openings 38, each of the flange openings corresponding to one of the stringer members 11. Together, the web openings 37 and the flange openings 38 allow the stringer members to extend through (i.e., be spliced by) the frame members 12, along the skin assembly 13 of the fuselage 10. Preferably, the web 36 of each of the frame members 12 has an area of increased thickness 39 around each of the openings 37 and each of the web openings is preferably circular to guard against crack initiation and propagation during loading of the fuselage 10 and to stabilize top flange 32. The size, shape and material construction of the members 11, 12 can be varied to suit the type of fuselage being assembled, and, therefore, the members as depicted herein should not be considered limiting.

Figure 5:
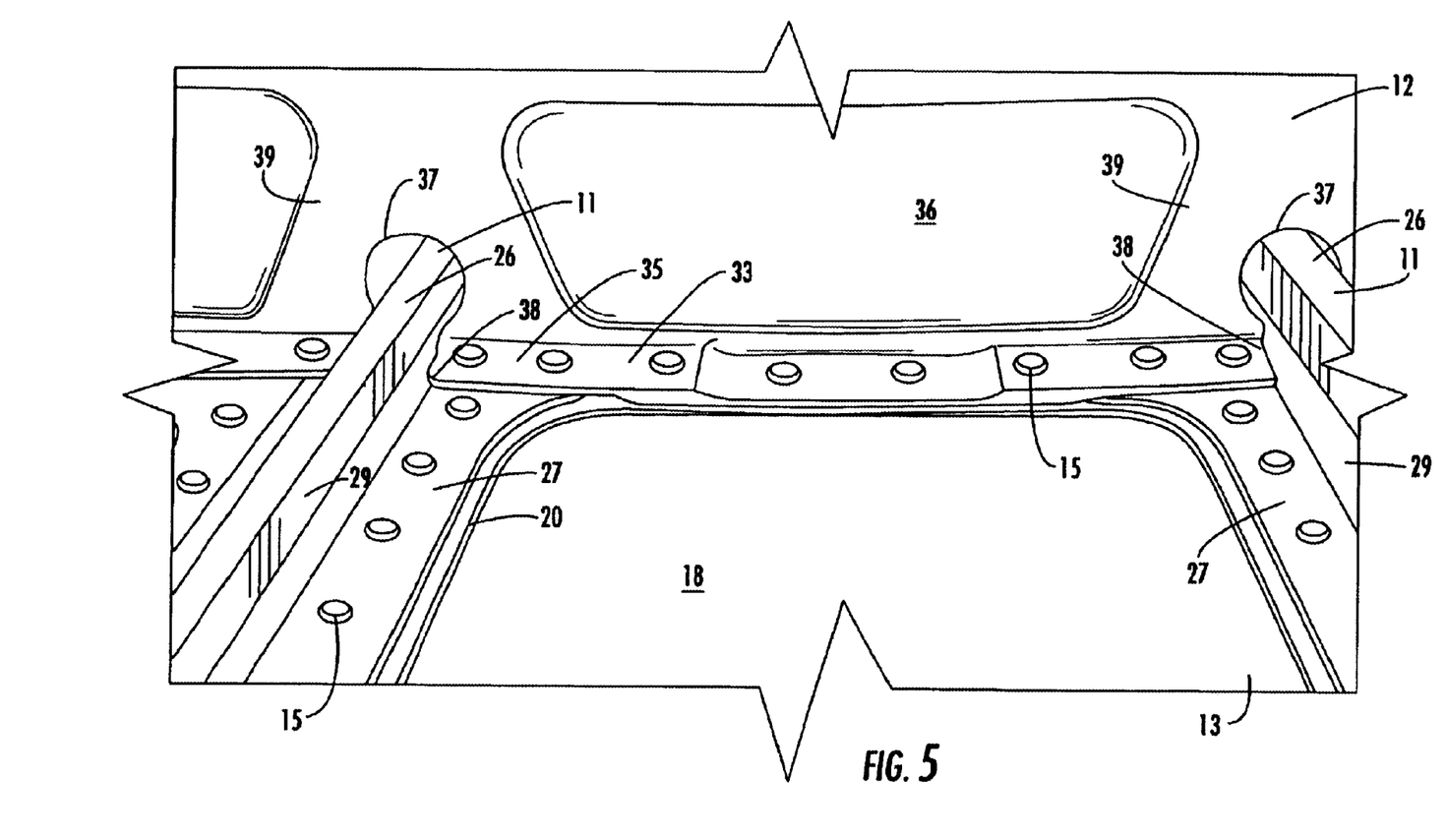
FIG. 5 is an enlarged perspective view of the inside of the fuselage of FIG. 1.

Because the stringer members 11 extend through the frame members 12, contact of the bottom flange 33 of each of the frame members 12 with the skin assembly 13 occurs at a plurality of circumferentially oriented surfaces 34 defined by the bottom flange, as shown in FIG. 5. Restated, the flange openings 38 interrupt the contact of the bottom surface of the bottom flange 33 with the skin assembly 13 as the bottom flange extends along the inner surface of the skin assembly. Overlapping portions 35 are formed between the bottom flanges at intersections of the stringer members 11 and frame members 12. These overlapping portions ensure that the members 11, 12 form a plurality of continuous circumferential outer surfaces that arrest crack propagation when attached to the aluminum doubler. Further, the bottom flanges 27 of the stringer members 11 are adjacent to the skin assembly 13 at the overlapping portions 35, allowing the stringers to be in close contact with the skin along the entire fuselage 10.

The fasteners 15 are spaced along the length of the bottom flanges 27, 33 of each of the stringer and frame members 11, 12. The fasteners 15 transfix the laminate skin 18, the doubler 20 and both of the bottom flanges 27, 33 in the overlapping portions 35. Therefore, use of the fasteners 15 in the overlapping portions 35 connects the frame members 12 to the stringer members 11, and both members to the skin assembly 13. The respective bottom flanges of the stringer and frame members 11, 12 are attached directly to the skin assembly 13 by the fasteners 15 in the non-overlapping portions.

Figure 6:
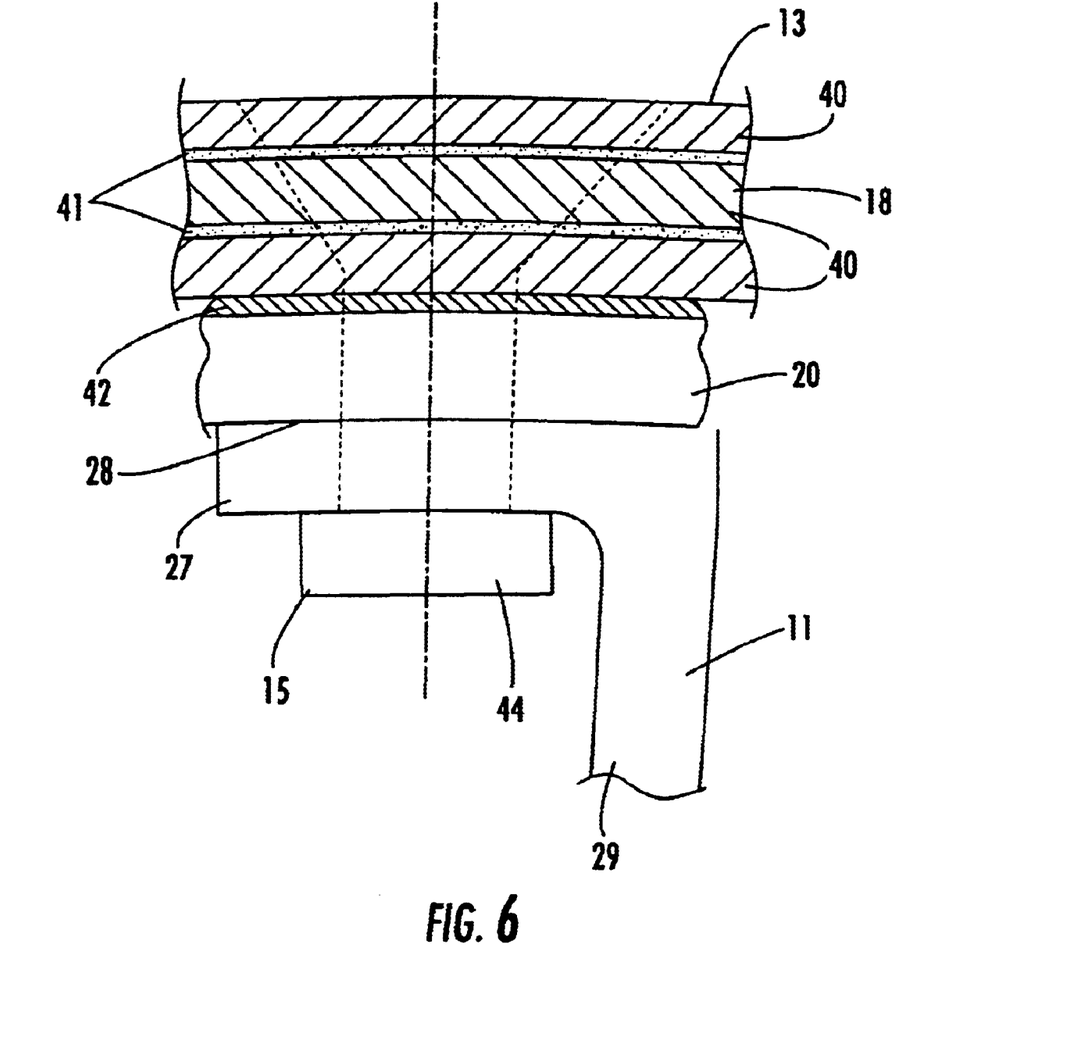
FIG. 6 is an enlarged cross-sectional view showing a connection between the laminate panel, the doubler and the stringer of the fuselage of FIG. 1 using a knife-edge, countersink fastener.

A typical attachment of the bottom flange 27 of one of the stringer members 11 to the skin assembly 13 using one of the fasteners 15 is shown in FIG. 6. In particular, one of the fasteners 15 is depicted in phantom lines and is a rivet that transfixes the laminate skin 18, the doubler 20 and the bottom flange 27 of the stringer and ends in a flattened end 44 for a secure fixation. The outer laminate skin 18 includes alternating aluminum foil layers 40 and fiberglass epoxy layers 41. Preferably, the foil layers 40 are 0.010 inch thick 2024-T3 aluminum and the fiberglass epoxy layers 41 are approximately 0.005 inch thick. A bond layer 42 connects the inner one of the foil layers 40 to the lightweight, aluminum doubler 20. Preferably, the bond layer is an adhesive bond that is approximately 0.005 inch thick. The outer laminate skin 18 may have a different number, or type, of layers, including variations in layer thickness modified to suit the desired application. For instance, additional, thicker layers 40, 41 may be needed for a heavier fuselage, or a fuselage that will be subjected to higher pressures. The doubler is tailored in thickness from 0.015 to 0.18 inches thick, depending upon local loads. Although aluminum is the preferred material for the doubler 20, other relatively lightweight materials could also be used to construct the doubler.

Assembly of the fuselage 10 preferably includes preparation of the surfaces to be bonded. The outer surfaces of the individual panels of the aluminum doubler 20 are anodized followed by application of a corrosion inhibiting adhesive primer. The inner surfaces of the individual panels of the laminate skin 18 are also anodized and primed. The adhesive bond layer 42 is applied to the primed surfaces of matching panels of the laminate skin 18 and the doubler 20. The matching panels are adhered together and, if necessary, cured to dry the bond layer.

After the panels have been prepared, the stringer members 11 and the frame members 12 are positioned in their desired final configuration. The cured panels of the skin assembly 13 are riveted to the outer surfaces 28, 34 of the positioned stringer and frame members. Riveting preferably includes driving knife-edged rivets through the layers of the laminate skin 18, the doubler 20 and one, or if in an overlapping region 35 both, of the bottom flanges 27, 33. The wedge shaped head end of the rivet is countersunk into the laminate skin 18 and the leading, knife-edged end is deformed into the flattened end 44 after it emerges from the bottom flange, as shown in FIG. 6.

The present invention has several advantages. The relatively thick and hard aluminum doubler 20 reduces the stresses around the fasteners 15 in the skin assembly 13. Such a reduction in the fixation stresses allows the use of a wider range of fastener types, such as the knife-edged, countersunk rivets illustrated herein that have excellent durability. Further, the doubler 20 is easily tailored to local loading conditions (unlike most laminate skins) and is an independent, fail-safe member. The doubler also allows the laminate skin 18 to have a constant gauge, or thickness, even in areas having cutouts (such as the window openings 19) or areas requiring the use of fasteners. A constant gauge skin is more cost-effective than a customized laminate skin requiring increased thickness in areas around fasteners or cutouts. The combined use of the bond layer 42 and the fasteners 15 results in an improvement in fuselage strength and reliability over the use of bonding alone to attach structural members directly to a laminate skin. In addition, the configuration of the stringer members 11 and the frame members 12 provides for continuous load paths along the length of the stringer members and the circumference of the frame members. The result is an overall increase in the strength of the fuselage 10 without a significant increase in weight. Such an increase in the strength of the fuselage provides the option of using smaller stringer and frame members 11, 12, to reduce the weight of the fuselage.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fuselage assembly for an aerospace craft defining a long axis, said fuselage assembly comprising:

a plurality of longitudinal stringer members radially spaced from, and extending generally parallel to, the longitudinal axis of the fuselage, said longitudinal stringer members further spaced circumferentially from each other, each of the longitudinal stringer members having a stringer wall structure including an outer longitudinal surface;

a plurality of annular frame members spaced along the longitudinal axis, each of the annular frame members having a frame wall structure including a plurality of outer circumferential surfaces, each of the outer circumferential surfaces interposed between a respective pair of the longitudinal stringer members;

a lightweight doubler attached to and covering at least a portion of the outer surfaces of the frame and stringer members; and a laminate sheet comprising alternating layers of metal and composite, said laminate sheet disposed over, and attached to, the lightweight doubler so as to form an outer skin of the fuselage strengthened by the underlying lightweight doubler, the annular frame members and the stringer members, wherein at least a portion of the laminate sheet disposed over the lightweight doubler defines an opening therethrough and has a constant gauge thickness approximately equal to another, remote portion of the laminate sheet that is free of openings and not disposed over the lightweight doubler.

2. A fuselage assembly of claim 1, wherein the stringer wall structure of each of the longitudinal stringers further includes a flange defining the outer longitudinal surface.

3. A fuselage assembly of claim 2, wherein the frame wall structure of each of the frame members includes a plurality of flanges, each of the flanges defining a respective one of the outer circumferential surfaces.

4. A fuselage assembly of claim 3, wherein each of the flanges of the frame wall structure overlaps a portion of the flange of each of the respective pair of longitudinal stringer members.

5. A fuselage assembly of claim 4, wherein the overlapping flange portions, the lightweight doubler and the laminate sheet are attached together using a fastener that extends through the opening in the constant gauge laminate sheet portion of the outer skin.

6. A fuselage assembly of claim 5, wherein the fastener is a knife-edge, countersink fastener.

7. A fuselage assembly of claim 1, wherein the laminate sheet is bonded to the lightweight doubler using an adhesive layer.

8. A fuselage assembly of claim 1, wherein the lightweight doubler is constructed of aluminum.

9. A fuselage assembly of claim 1, wherein the metal layers of the laminate sheet are aluminum layers and the composite layers are fiberglass-epoxy layers.

10. A fuselage assembly of claim 1, wherein the opening in the constant gauge laminate sheet portion of the outer skin defines one of a plurality of cutouts.

11. A fuselage assembly of claim 10, wherein each of the plurality of cutouts houses one of a plurality of windows.

12. A method of assembling a skin of a lightweight fuselage to a support structure including a plurality of longitudinal stinger members and annular frame members, the method of attaching the skin comprising:

positioning the stringer members and frame members so that the members define a plurality of outer surfaces;

bonding a plurality of lightweight doubler panels to respective laminate skin panels to form a plurality of skin assembly panels;

positioning each of the skin assembly panels over a respective portion of the plurality of outer surfaces; and attaching each of the skin assembly panels to the respective portion of the plurality of outer surfaces by transfixing the skin assembly panels and the members with a plurality of fasteners wherein at least one of the fasteners is transfixed through a portion of one of the skin assembly panels including the laminate skin and doubler, said laminate skin having a constant gauge thickness with respect to another remote portion of the laminate skin not disposed over the lightweight doubler.

13. A method of claim 12, wherein bonding includes anodizing surfaces of the doubler panels and laminate skin panels.

14. A method of claim 13, wherein bonding includes application of an adhesive primer to the surfaces of the doubler panels and laminate skin panels.

15. A method of claim 12, wherein the plurality of fasteners are a plurality of knife-edged rivets and wherein attaching each of the panels includes countersinking the knife-edged rivets.

16. A method of claim 12, wherein positioning includes splicing the frame members with the longitudinal members.

17. A method of claim 12, wherein positioning includes forming a plurality of continuous circumferential outer surfaces with the members and wherein attaching the skin assembly panels includes attaching the doubler panels adjacent the circumferential outer surfaces and arresting skin crack propagation.

* * * * *

UNITED STATES PATENT AND TRADEMARK OFFICE
CERTIFICATE OF CORRECTION

PATENT NO. : 6,648,273 B2
DATED : November 18, 2003
INVENTOR(S) : Anast

It is certified that error appears in the above-identified patent and that said Letters Patent is hereby corrected as shown below:

<u>Column 8,</u>
Line 1, "stinger" should read -- stringer --;
Line 5, begin new sub-paragraph with "bonding".

Signed and Sealed this

Thirteenth Day of January, 2004

JON W. DUDAS
*Acting Director of the United States Patent and Trademark Office*